Oct. 15, 1968   E. R. BRANDT   3,405,562

STOP MECHANISM FOR ROTATING MEMBERS

Filed Dec. 2, 1966

INVENTOR.
Edison R. Brandt

BY

Brown and Mikulka
ATTORNEYS

United States Patent Office 3,405,562
Patented Oct. 15, 1968

3,405,562
STOP MECHANISM FOR ROTATING MEMBERS
Edison R. Brandt, Cohasset, Mass., assignor to Polaroid Corporation, Cambridge, Mass., a corporation of Delaware
Filed Dec. 2, 1966, Ser. No. 598,799
3 Claims. (Cl. 74—10.2)

ABSTRACT OF THE DISCLOSURE

Each of two meshing gears has a pin in one of a plurality of selectable positions. A rocker member on a fixed axis has a pair of arms, each engageable with a pin. When both arms simultaneously engage the pins rotation of the gears is arrested.

---

This invention relates to stop mechanisms and particularly to shaft positioning devices of improved construction.

The majority of known stop mechanisms for rotating devices are of three types. The first utilizes a detent on a rotating member adapted to receive a pawl type member which upon proper positioning of the rotating member will fall into the detent and effect a stop. A second employs an extension pin on the rotatable member which is designed to contact a rigid member to form the stop. Where gears are used, a third method of filling in one tooth of a gear may be employed, causing the gear to bind with a meshing gear when the filled-in tooth contacts the second gear.

These approaches are limited in that they allow only one or two revolutions of the rotating member before a stop is effected or cause excessive radial loads. The system of the present invention, by proper choice of dimensions and ratios, provides a wide selection of the number of revolutions a rotating member may carry out before coming to a stop.

Accordingly, a primary object of this invention is to provide a mechanism for stopping rotating parts of machines after a predetermined number of turns.

Another object of this invention is to provide a mechanism possessing such means as will cause a positive stop at the desired point.

A further object of this invention is to provide a stopping mechanism for rotating members with means for easily and accurately adjusting the stopping position.

A further object of this invention is to provide means which will not cause the members affected to bind.

An additional object of this invention is to provide such means as will cause a minimum of wear and tear on the rotatable members.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawing wherein.

In accordance with the present invention, a stop mechanism, particularly adapted to selectively restrain the rotation of a rotatable member, comprises, in combination, at least two mutually engageable rotating members. Each of the rotatable members retains an elongated member extending in substantially the same direction transverse the plane of the rotatable member and a rocker arm is pivotally mounted intermediate the extending members and biased into interengagement with the extending members, at a selected position of rotation.

Figure 1:
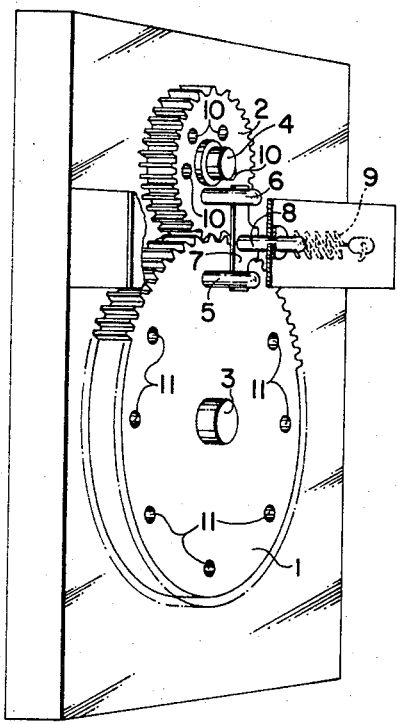
FIGURE 1 is a perspective view of one embodiment of the invention.

In accordance with a preferred embodiment of the present invention, the mechanism detailed in FIGURE 1 includes two gears in mesh each having a stop pin mounted on its face. A rocker arm is pivotally mounted intermediate, and biased into contact with, the two stop pins when, by rotation of the gears, the two pins are directly opposite each other. Accordingly, when the stop pins are positioned opposite, they contact the arm and oppose further motion of the gears thus effecting the stop. When they are not directly opposite, the stop pins each in turn, push the arm aside as they rotate past the pivot on which the arm is mounted.

In FIGURE 1 gear 1 is mounted on shaft 3 and gear 2 is mounted parallel and in mesh with gear 1 on shaft 4. Gear 1 and gear 2 have stop pins 5 and 6 mounted on their respective faces. Rocker arm 7 is pivotally mounted on shaft 8 and is biased into an upright position by the tension provided by spring 9.

Either gear 1 or gear 2 may be the primary drive gear and either gear may be selected as the stop gear. Each gear may have a suitable number of mounting holes for selectively positioning the stop pins on its face as, for example, gear 1 has holes 11 and gear 2 has holes 10. Thus, depending upon the usage of the invention, the relative stop positions of the shafts, may be selectively varied in such positions as desired, for example, shafts 4 and 5 may be individually varied in as many combinations as there are mounting holes for stop pins in each gear.

Figure 2:
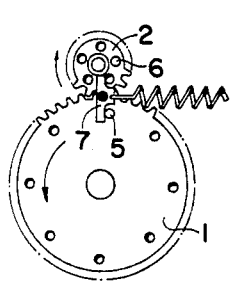
FIGURES 2, 3, 4 and 5 are schematic diagrams of the positions of the gears after various rotations of the respective gears in the illustrative embodiment of the invention detailed herein.

The rotational members may be operated in either a clockwise or counterclockwise direction. It will be understood that any gear ratio expressed in whole numbers may be chosen. The stop will occur at that point at which each gear has rotated through a whole number of turns. For example, in a gear system which has the ratio of 2.75 to one, the small gear will rotate eleven times and the large gear four times before a stop, this being the ratio in whole numbers. Taking the position of the pins in FIGURE 1 as a starting point and a gear ratio of 2.75 to one, for example, a small gear of 32 teeth and a large gear of 88 teeth, the position of the pins after one counterclockwise rotation of the large gear will be that of FIGURE 2, the small gear having rotated 2.75 turns.

Figure 3:
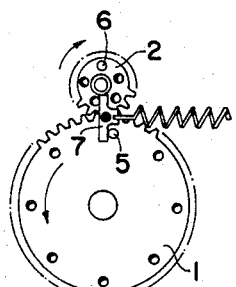

FIGURE 3 shows the position of the stop pins after two rotations of the large gear, the small gear having rotated 5.5 turns.

Figure 4:
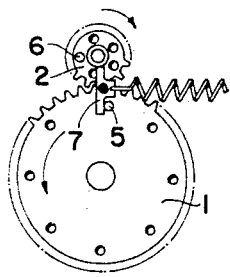
Figure 5:
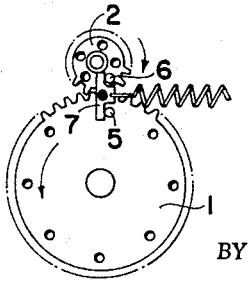

FIGURE 4 and FIGURE 5 show the pin positions after three and four turns of the larger gear. Upon completion of the fourth turn of the larger gear, it will be seen that both stop pins have engaged the rocker arm at the same time the rotation of both gears has stopped and the reaction of force due to stopping is tangential. The smaller gear has now rotated eleven times.

It may be seen that by the proper selection of ratios, a limitless combination of turns of the respective gears may be devised before a stop is effected and as mentioned above the stop position of each gear may be altered at will by changing the mounting position of the two stop pins.

It will be clearly recognized that the present invention may also be practiced utilizing any combination of rotating members equivalent to the gear members comprising the preferred embodiment detailed above for illustrative purposes, for example, a planetary gear system or where one gear is an internal tooth gear or, where no gears are desired, two shafts containing pulleys linked by a belt, or the like.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A stop mechanism for preventing the rotation of a rotating member comprising, in combination, at least two mutually engaging rotatable members, an extending member mounted on each of the rotatable members, and a rocker arm for stopping rotation pivotally mounted such that it will engage both extending members simutlaneously at a periodic point in the rotation of the two rotatable members.

2. The combination of claim 1 wherein the rotatable members are meshed gears.

3. The combination of claim 1 including means for alternatively mounting the extending members in different circumferential positions on the rotatable members.

References Cited

UNITED STATES PATENTS

| | | | |
|---|---|---|---|
| 2,716,896 | 9/1965 | Beldt et al. | 74—10.2 |
| 2,918,157 | 12/1959 | Nichols et al. | 74—10.2 X |

MILTON KAUFMAN, *Primary Examiner.*